(12) United States Patent
Bevly et al.

(10) Patent No.: US 6,434,462 B1
(45) Date of Patent: Aug. 13, 2002

(54) GPS CONTROL OF A TRACTOR-TOWED IMPLEMENT

(75) Inventors: David Mark Bevly, Robstown, TX (US); Bradford Wells Parkinson, Mt. View, CA (US); Robert Lynn Mayfield, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/894,150

(22) Filed: Jun. 28, 2001

(51) Int. Cl.[7] ................................................. G06G 7/76
(52) U.S. Cl. ............................. 701/50; 701/33; 701/41; 172/3; 172/4.5
(58) Field of Search ............................. 701/50, 33, 41, 701/81, 88, 89; 172/3, 4.5, 9

(56) References Cited

U.S. PATENT DOCUMENTS

| | | | |
|---|---|---|---|
| 5,505,267 A | * 4/1996 | Orbach et al. .................. | 172/3 |
| 5,572,218 A | 11/1996 | Cohen et al. ................ | 342/357 |
| 5,629,855 A | 5/1997 | Kyrtsos et al. .............. | 364/460 |
| 5,764,511 A | 6/1998 | Henderson ............. | 364/167.01 |
| 5,802,489 A | * 9/1998 | Orbach et al. ................. | 701/50 |
| 5,951,613 A | 9/1999 | Sahm et al. ................... | 701/50 |
| 5,991,694 A | 11/1999 | Gudat et al. ..................... | 702/2 |
| 6,037,901 A | 3/2000 | Devier et al. .......... | 342/357.17 |
| 6,052,647 A | 4/2000 | Parkinson et al. .......... | 701/215 |
| 6,199,000 B1 | 3/2001 | Keller et al. ................... | 701/50 |

OTHER PUBLICATIONS

David Bevly et al.; "Carrier–Phase Differential GPS for Control of a Tractor Towed Implement"; Sep. 2000; 6 pages.
F. Lamiraux et al.; "A Practical Approach to Feedback Control for a Mobile Robot with Trailer"; May 1998 pp. 3291–3296.
Patrick Y. C. Hwang, "Kinematic GPS for Differential Positioning: Resolving Integer Ambiguities on the Fly"; Oct. 1990, pp. 1–15.
R. P. Van Zuydam; "Centimeter–Precision Guidance of Agricultural Implements in the Open Field by Means of Real Time Kinematic DGPS"; Jul. 1998, pp. 1023–1034.
Jussi Mononen et al.; "Development of Autonomous Vehicles for Commercial and Government Applications"; May 1994; 10 pages.
T. Nieminen et al.: "Development of a Control System for Autonomous Agricultural Vehicles"; 1996; 8 pages.
L. A. Smith et al.; "Control Algorithms for Tractor–Implement Guidance"; Jan. 1985; pp. 415–419.
Turo Nieminen et al.; "Unmanned Tractors for Argicultural Applications"; Sep. 1994; 12 pages.
Michael L. O'Connor et al.; "Carrier–Phase DGPS for Closed–Loop Control of Farm and Vehicles"; 1996; pp. 167–178.
W. E. Larsen et al.; "Precision Navigation With GPS"; 1994; pp. 86–95.
David M. Bevly et al.; "Evaluation of a Blended Dead Reckoning and Carrier Phase Differential GPS System for Control of an Off–Road Vehicle"; Sep. 1999; 5 pages.
D. M. Bevly, et al.; "Yaw Dynamic Modeling for Improved High Speed Control of a Farm Tractor"; 2000; 4 pages.

* cited by examiner

*Primary Examiner*—Gertrude Arthur

(57) ABSTRACT

A control system controls a work vehicle towing a towed implement. The control system includes a steering angle sensor, an implement position generating unit generating an actual implement position signal, a desired implement position generating unit generating a desired implement position signal, a vehicle position generating unit generating an actual vehicle position signal, a processor unit generating an implement angle signal as a function of the actual implement position signal and the actual vehicle position signal, and a control processor generating the steering control signal as a function of the actual implement position signal, the actual vehicle position signal, the implement angle signal, the steering angle signal and the desired implement position signal. A vehicle steering actuator steering vehicle steerable wheels in response to the control signal.

9 Claims, 2 Drawing Sheets

US 6,434,462 B1

GPS CONTROL OF A TRACTOR-TOWED IMPLEMENT

FIELD OF THE INVENTION

The invention relates to a system for automatically steering a tractor in response to an implement position signal generated by global positioning system (GPS) receiver on an implement being pulled by the tractor.

BACKGROUND OF THE INVENTION

There are known control systems for controlling robotic vehicles pulling trailers. There are also known control systems for controlling heavy trailer truck combinations. However, such systems are not designed to specifically control the location of the trailer. A system is also known for controlling a tractor mounted implement, using GPS measurements, through actuation of the implement itself. However, large actuation forces are required to move large towed implements plowing soil, and in some cases the actuation moves the tractor instead of the implement.

Larsen, W. E., Nielsen, G. A., Tyler, D. A., "Precision Navigation with GPS," in Computers and Electronics in Agriculture, Vol. 11, 1995, pp. 85–95, suggest that GPS can be used to navigate a tractor and implement along a predetermined path, and appears to describe a model which, based on the geometry of the tractor and implement, determines or calculates the position of the implement. However, in certain situation, using a model to calculate implement position can produce erroneous implement position information, such as when a tractor and an implement are operating on a hillside.

Smith, L. A., Schafer, R. L. and Young, R. E., in "Control Algorithms for Tractor-Implement Guidance," Transactions of the ASAE, Vol. 28, No. 2, March–April 1985, pp. 415–419 describe control algorithms for guiding a tractor-implement combination. However, these algorithms are based on a "constant-turn" geometric relationship, and, in the aforesaid hillside situation, using such a geometric relationship can also produce erroneous implement position information.

U.S. Pat. No. 5,764,511, issued Jun. 9, 1998 to Henderson, discloses a system and method for controlling the slope of cut of a work implement moved across a terrain by a vehicle. However, this system does not control the steering of the vehicle.

SUMMARY OF THE INVENTION

Accordingly, it is desired to provide a control system designed to accurately control the position of an implement towed by a tractor.

A further object of the invention is to provide such a system which utilizes GPS technology.

Another object of the invention is to provide such a system which uses differential carrier-phase GPS measurements on both the tractor and towed implement.

Another object of the invention is to provide such a system wherein control is accomplished through the steering actuation of the tractor.

These and other objects are achieved by the present invention, wherein a control system is provided for a work vehicle towing a towed implement. The vehicle has a steering system including a steering actuator for steering steerable wheels. The control system includes a steering angle sensor for generating a steering angle signal representing an angular position of the steerable wheels, and an implement GPS antenna and receiver on the implement for generating implement position data. The control system also includes a fixed land-based GPS antenna and receiver for generating reference position data. A set of vehicle GPS antennas are mounted on the vehicle, and a vehicle GPS receiver is coupled to one of the vehicle GPS antennas and generates vehicle position data. A vehicle wireless receiver receives transmitted reference position data. A vector unit coupled to the vehicle GPS antennas generates a vehicle attitude signal. A first processor generates an implement position signal as a function of the implement position data and the reference position data. A second processor generates a vehicle position signal as a function of the vehicle position data and the reference position data. An inverse kinematics processor is coupled to the first and second processors and to the vector unit, and generates an implement angle signal as a function of the implement position data, the vehicle position data and the vehicle attitude signal. A control processor is coupled to the first and second processors, to the vector unit, to the an inverse kinematics processor, to the steering angle sensor, and generates a steering control signal as a function of the implement position data, the vehicle position data and the vehicle attitude signal, the implement angle signal, the steering angle signal and a stored desired implement position signal (such as a pair of east/west coordinates). The steering actuator receives the steering control signal and steers the steerable wheels in response thereto.

DESCRIPTION OF THE PREFERRED EMBODIMENT

Figure 1:
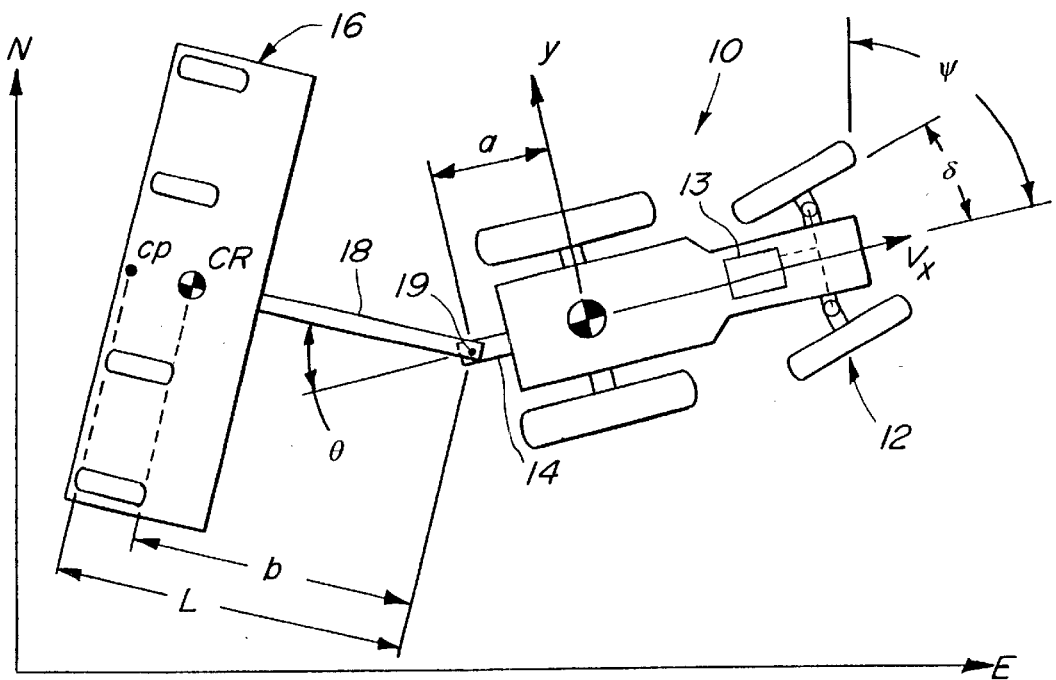
FIG. 1 is a simplified schematic diagram of an implement towed by a tractor.
Figure 2:
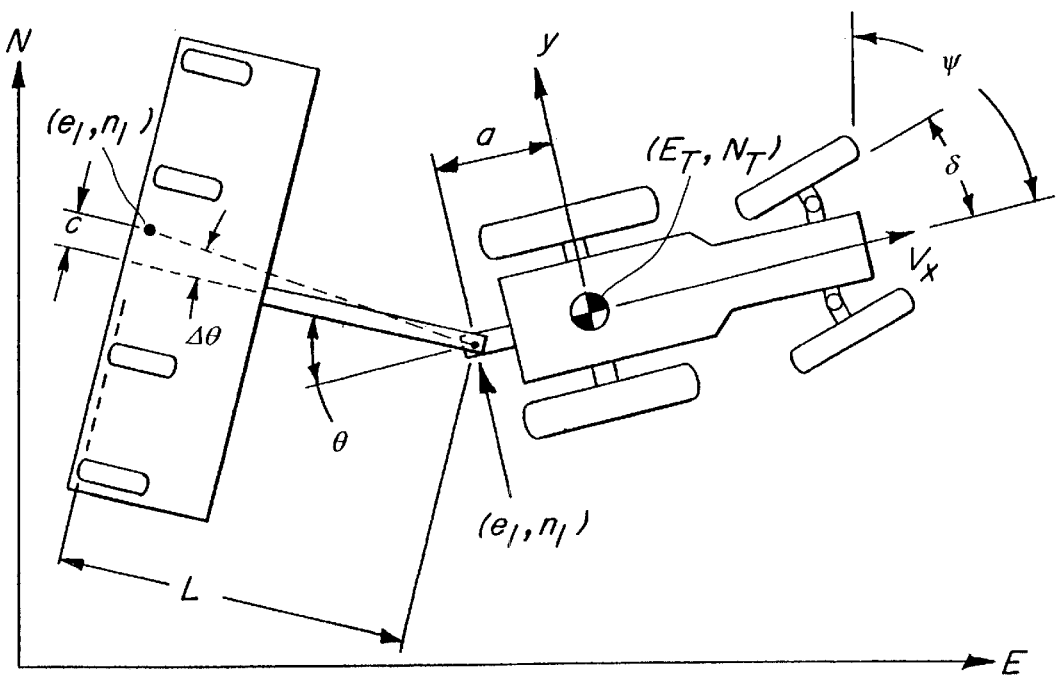
FIG. 2 is a simplified schematic diagram similar to FIG. 1, but illustrating the variables involved in calculating the implement angle θ.

Referring to FIGS. 1 and 2, a tractor 10 includes steerable wheels 12 steered by an electrically actuated steering valve 13 and a drawbar 14. The steering valve provides a steering slew rate. A towed implement 16, has a tongue 18 which is pivotally coupled to the drawbar 14 by a tow pin 19 so that the implement 16 can be towed through a field by the tractor 10. The implement's kinematic center of rotation (CR) as well as the implement control point (cp) are shown in FIG. 1. The center of rotation is the point on the implement 16 where the lateral velocity is equal to zero, which is the point that the implement 16 rotates about. The tractor has position, velocity, heading, yaw, yaw rate, yaw acceleration, heading bias, steer angle, steering angle slew rate, steer angle bias, gyro bias and radar bias parameters as shown in FIG. 1 and as indicated in Table I.

Figure 3:
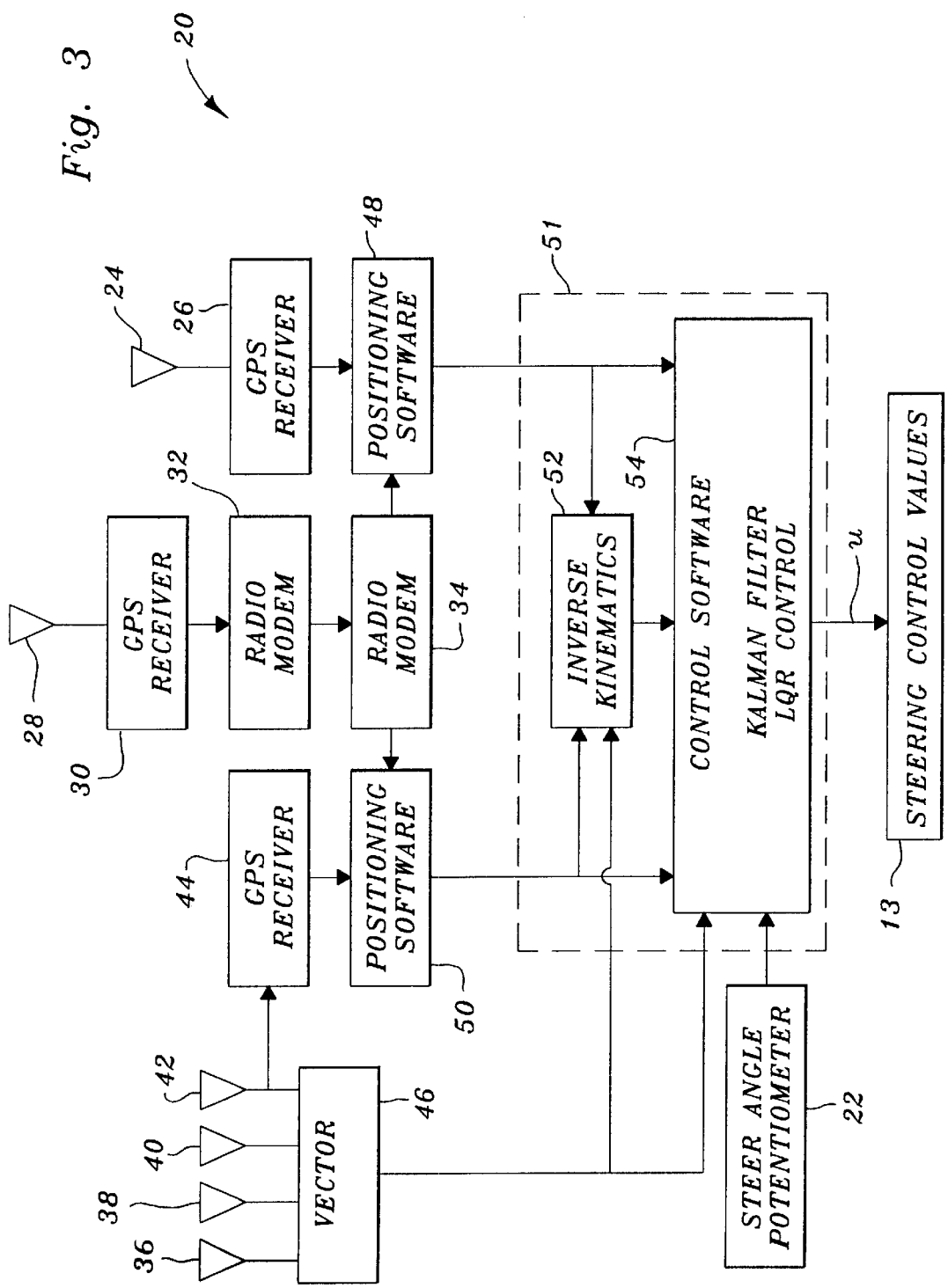
FIG. 3 is a simplified control system block diagram of the control system of the present invention.

Referring now to FIG. 3, the control system 20 includes a steering angle sensor 22, such as a linear potentiometer, for generating a steering angle signal δ representing an angular position of the steerable wheels 12. An implement GPS antenna 24 is mounted on the implement 16 at the control point cp. A first GPS receiver 26 is coupled to the implement GPS antenna 24 and generates implement position data. GPS receiver 26 may be mounted on either the tractor 10 or the implement 16.

A fixed land-based GPS antenna 28 is mounted at a fixed location on the earth. A second GPS receiver 30 is coupled to the land-based GPS antenna 28 and generates reference position data. A wireless transmitter 32, such as a commercially available radio modem, transmits the reference position data to a vehicle mounted wireless receiver 34, also a commercially available radio modem.

A plurality of vehicle GPS antennas 36–42 are mounted on the tractor 10. A third GPS receiver 44 is coupled to one of the vehicle GPS antennas 42 and generates vehicle position data. A known vector unit 46, such as Part No. 27760-00, manufactured by Trimble Navigation Limited, is coupled to the vehicle GPS antennas 36–42 and generates a vehicle attitude signal including tractor yaw ($\psi$), roll ($\phi$) and pitch ($\lambda$) data. For further information relating to such a vector unit and the generation of such an attitude signal, reference is made to Parkinson, B. W., and Spilker, J. J., ed.: Global Positioning System: Theory and Applications, Volume 1–2, AIAA, 1996; Cohen C. E., Parkinson, B. W., and McNally, B. D.,: Flight Tests of Attitude Determination Using GPS Compared Against an Inertial Navigation Unit, Navigation: Journal of the Institute of Navigation, Vol. 41, No. 1, Spring 1994; and to the following issued patents: U.S. Pat. No. 5,268,695, issued to Dentinger, et al. in 1993, U.S. Pat. No. 5,296,861, issued to Knight in 1994, U.S. Pat. No. 4,847,862, issued to Braisted, et al. in 1989, U.S. Pat. No. 5,548,293, issued to Cohen in 1996, and U.S. Pat. No. 5,101,356, issued to Timothy, et al. in 1992. Alternatively, yaw rate information could be provided by a sensor such as a commercially available fiber optic gyro.

A first processor 48 is coupled to GPS receiver 26 and to wireless receiver 34 and generates an implement position signal as a function of the implement position data and the reference position data. A second processor 50 is coupled to GPS receiver 44 and to wireless receiver 34, and generates a vehicle position signal as a function of the vehicle position data and the reference position data. Processors 48 and 50 both utilize known techniques such as Carrier Phase Differential GPS (also known as RTK GPS or Kinematic DGPS), such as described in U.S. Pat. No. 5,572,218, issued to Cohen, et al. in 1996.

A tractor electronic control unit 51 includes an inverse kinematics processor 52 and a control processor 54. The inverse kinematics processor 52 is coupled to processors 48 and 50 and to vector unit 46, and generates an implement angle signal $\theta$ as a function of the implement position data, the vehicle position data and the vehicle attitude signal. The implement angle ($\theta$) is calculated from inverse kinematics using known geometrical relationships, the implement position ($e_I$, $n_I$), the tractor position ($E_T$, $N_T$), tractor heading ($\psi$) as well as the position of the tow pin relative to the implement and tractor positions (a, L, c), as shown in FIG. 2. Preferably, a microprocessor (not shown) interacts with the steering valve 13 and the steer angle sensor 22 and communicates with the control unit 51 via a serial communications link (not shown). The control unit 51 preferably executes control and estimation algorithms at a 5 Hz rate using an operating system such as a Lynx real time operating system. For further information relating to the inverse kinematics processor 52, and relating to calculation of the implement angle ($\theta$) using simple geometry, reference is hereby made to Craig, J., *Introduction to Robotics*, Addison-Wesley, New York, USA, 1986, and to Asada, H., Slotine, J.-J., *Robot Analysis and Control*, Wiley-Interscience, 1986. The control processor 54 generates a steering control signal, u, which is a pulse width modulated (PWM) voltage which is applied to the electrically actuated steering valve 13 of the tractor 10.

Referring again to FIG. 1, the dynamics of the tractor 10 and implement 16 are described by the following equations (1–5). The tractor position dynamics are described by:

$$\dot{E}_T = V_x \sin(\psi)$$

$$\dot{N}_T = V_x \cos(\psi) \quad (1)$$

The tractor yaw dynamics are described by:

$$\ddot{\psi} = -2\xi\omega_n\dot{\psi} - \omega_n^2\dot{\psi} + K_R\dot{\delta}K_R Z\delta \quad (2)$$

The steering dynamics are described by:

$$\dot{\delta} = -\frac{d_v}{I_v}\delta + \frac{K_v}{I_v}u \quad (3)$$

where the control input (u) is a pulse width modulated (PWM) voltage to a electro-hydraulic valve used to steer the front wheels.

The implement angle dynamics are described by:

$$\dot{e}_I = \dot{E}_T + (b\theta - b\psi)\cos(\theta - \psi) - a\dot{\psi}\cos(\psi)$$

$$\dot{n}_I = \dot{N}_T + (b\theta - b\psi)\sin(\theta - \psi) + a\dot{\psi}\sin(\psi) \quad (4)$$

The implement angle dynamics are described by:

$$\dot{\theta} = \dot{\psi}\left[1 + \frac{a}{b}\cos(\theta)\right] - \frac{v_x}{b}\sin(\theta) \quad (5)$$

The model dynamics in equations (1) through (5) are of the form:

$$\dot{X} = f(X) + Bu \quad (6)$$

In order to utilize known state space control and estimation techniques, equations (1–5) are placed in the form:

$$\dot{X} = AX + Bu$$

$$Y = CX \quad (7)$$

First, the position of the tow pin 19 is calculated by:

$$e_I = E_T - a\sin(\psi)$$

$$n_I = N_T - a\cos(\psi)$$

Then the offset angle of the implement GPS receiver 26 is calculated. (Note: the offset angle will be zero if the GPS receiver 26 is placed along the center line of the implement 16).

$$\Delta\theta = \tan^{-1}(c/L)$$

Then the angle between the GPS receiver 26 and tow pin 19 is calculated:

$$\theta_1 = \tan^{-1}\left(\frac{e_I - e_1}{n_I - n_1}\right)$$

The above angle is in Cartesian space and is the sum of the following angles:

$$\theta_I, \psi + 180° + \theta + \Delta\theta$$

Finally, the above equation is arranged as follows to determine the implement angle $\theta$:

$$\theta = \theta_I - (180° + \psi + \Delta\theta).$$

The control processor 54 is coupled to the first and second processors 48 and 50, to the vector unit 46, to the inverse kinematics processor 52 and to the steering angle sensor 22, and receives a stored desired implement position signal. Control processor 54 executes an estimation algorithm which determines the 16 states listed in Table I so that the implement 16 can be a accurately controlled. For further information relating to the control processor 54, reference is made to O'Connor, M. L., Elkaim, G. H., Parkinson, B. W., "Carrier Phase DGPS for Closed-Loop Control of Farm and Construction Vehicles," *Navigation: Journal of the Institute of Navigation*, Vol. 43, No. 2, Summer 1996, pp.167–278, to Bevly, D. M., Gerdes, J. C., Parkinson, B., "Yaw Dynamic Modeling for Improved High Speed Control of a Farm Tractor," *Proceedings of the* 2000 *ASME IMECE*, Orlando, Fla., to Bevly, D. M., Rekow, A., and Parkinson, B.: Evaluation of a Blended Dead-Reckoning and Carrier Phase Differential GPS System for control of an Off-Road Vehicle, Proceedings of the 1999 ION-GPS Meeting, Nashville, Tenn., September 1999, and to U.S. Pat. No. 6,052,647, issued to Parkinson, et al. in 2000.

Because the dynamics equations described earlier are non-linear, they are linearized about an operating point at each time in order to place the dynamics in the form shown in equation (7). This is done by solving for the Jacobian (J) at each time step such that:

$$\dot{X}=JX+Bu \quad (11)$$

where:

$$J = \begin{bmatrix} \frac{\partial f_1}{\partial x_1} & \cdots & \frac{\partial f_1}{\partial x_n} \\ \vdots & & \vdots \\ \frac{\partial f_n}{\partial x_1} & \cdots & \frac{\partial f_n}{\partial x_n} \end{bmatrix}$$

The biases and velocity of the tractor are assumed to be constant such that:

$$\dot{V}_x=\dot{\psi}_{bias}=\dot{g}_{bias}=\dot{r}_{bias}=\dot{\delta}_{bias}=\dot{\theta}_{bias}=0$$

The observation matrix (C) is described by:

$$Y_{meas}=CX+v \quad (12)$$

where:

$$Y_{meas}=[E_T^{GPS}\ N_T^{GPS}\ \psi^{GPS}\ \delta^{pot}\ \dot{\psi}^{gyro}\ V_x^{radar}\ e_I^{GPS}\ n_I^{GPS}\ \theta^{inv\_kin}]^T$$

v=unknown sensor noise vector (9×1);
There are 5 sensor bias so that:

$$\psi^{GPS}=\psi+\psi_{bias}$$

$$\delta^{pot}=\delta+\delta_{bias}$$

$$V_x^{radar}=V_x+r_{bias}$$

$$\dot{\psi}^{gyro}=\dot{\psi}+g_{bias}$$

$$\theta^{inv\_kin}=\theta+\theta_{bias} \quad (13)$$

The estimated states are shown in Table I and the estimated state vector is:

$$\hat{X} = \begin{bmatrix} \hat{X}_T \\ \hat{X}_I \end{bmatrix} \quad (14)$$

(where ^ denotes estimates).

TABLE I

Estimated States

| Tractor | Implement |
|---|---|
| $\hat{X}_T = [\hat{E}_T\ \hat{N}_T\ \hat{V}_X\ \hat{\psi}\ \hat{\dot{\psi}}\ \hat{\ddot{\psi}}\ \hat{\psi}_b\ \hat{\delta}\ \hat{\dot{\delta}}\ \hat{\delta}_b\ \hat{g}_b\ \hat{r}_b]^T$ | $\hat{X}_I = [\hat{e}_I\ \hat{n}_I\ \hat{\theta}\ \hat{\theta}_b]^T$ |
| E = tractor east position | e = east position |
| N = tractor north position | n = north position |
| $V_X$ = forward velocity | θ = angle |
| ψ = heading | $θ_b$ = angle bias |
| $\dot{\psi}$ = yaw rate | |
| $\ddot{\psi}$ = yaw acceleration | |
| $\psi_b$ = heading bias or "crab angle" | |
| δ = steer angle | |
| $\dot{\delta}$ = steering slew rate | |
| $\delta_b$ = steer angle bias | |
| $g_b$ = gyro bias | |
| $r_b$ = radar bias | |

The control processor 54 also includes an Extended Kalman Filter (EKF) which includes a measurement update and time update, which is performed at each time step (k). For further information relating to Kalman Filters, reference is made to Stengel, R., *Optimal Control and Estimation*, Dover ed, Dover Publications, Meneola, N.Y., 1994, and to Franklin, G., Powell, D., Workman, M., *Digital Control of Dynamic Systems*, 3$^{rd}$ Ed., Addison-Wesley, Menlo Park, Calif., 1998. The measurement updated is described as follows:

$$L_k=P_kC^T(CP_kC^T+R)^{-1}$$

$$\hat{X}_k=\hat{X}_k+L_k(y_{meas}-C\hat{X}_k)$$

$$P_k=(I-L_kC)P_k \quad (15)$$

where L=Kalman Gain Vector, P=State Estimation Covariance Matrix, C=Observation Matrix, R=Sensor Noise Vector, I=Identity Matrix, and $\hat{X}$=State Estimate Vector.

The time update is described by:

$$\hat{X}_{k+1}=\dot{\hat{X}}_k\Delta t$$

$$P_{k+1}=\Phi P_k\Phi^T+Q_w \quad (16)$$

where Φ=discretized Jacobian (J) at each time step, $Q_w$=discretized process noise matrix, Δt=sample rate, and $\dot{\hat{X}}$ is obtained from equations (1–5). The EKF provides estimates of all the states in Table I at every time step.

The control processor 54 also includes a linear quadratic regulator (LQR) which controls the lateral error ($y_I$) of the implement. Setting the control point along the center line of the implement at a distance L from the tow pin (as shown in FIG. 1) and assuming small heading errors and implement angle, the lateral dynamics of the implement are described by:

$$\dot{y}_I=V_X\psi+L\dot{\theta}-(\alpha+L)\dot{\psi} \quad (17)$$

Linearizing equation (5) about small angles results in:

$$\dot{\theta} = \left(1+\frac{a}{b}\right)\dot{\psi}-\frac{V_X}{b}\theta \quad (18)$$

The remaining dynamics necessary for full state feedback control are the yaw and steering dynamics in equations (2–3). Again Equations (17–18) and Equations (2–3) must be placed into the state space form shown in equation (7) for the lateral control states ($X_c$):

$$\dot{X}_C = A_C X_C + B_C u \quad (19)$$

where $$X_C = [y_l \; \theta \; \psi \; \dot{\psi} \; \ddot{\psi} \; \delta \; \dot{\delta}]^T$$

$$A_C = \begin{bmatrix} 0 & \frac{-V_X L_l}{b} & V_X & \frac{a(L_l - b)}{b} & 0 & 0 & 0 \\ 0 & \frac{-V_X}{b} & 0 & 1 + a/b & 0 & 0 & 0 \\ 0 & 0 & 0 & 1 & 0 & 0 & 0 \\ 0 & 0 & 0 & 0 & 1 & 0 & 0 \\ 0 & 0 & 0 & -\omega_n^2 & -2\xi\omega_n & K_R Z & K_R \\ 0 & 0 & 0 & 0 & 0 & 0 & 1 \\ 0 & 0 & 0 & 0 & 0 & 0 & -d_V/I_V \end{bmatrix}$$

$$B_C = [0 \; 0 \; 0 \; 0 \; 0 \; 0 \; K_V/I_V]^T$$

The linear lateral dynamics can then be used to calculate the LQR control gains for the control law:

$$u = -K_{comp} X_{comp} \quad (20)$$

where:

$$X_{comp} = [\hat{y}_l \; \hat{\theta} \; \hat{\psi}_{err} \; \hat{\dot{\psi}} \; \hat{\ddot{\psi}} \; \hat{\delta} \; \hat{\dot{\delta}}]^T$$

and where the ^ denotes estimates. The heading error $\hat{\psi}_{err}$ is simply the difference in the desired and actual heading:

$$\hat{\psi}_{err} = \hat{\psi} - \psi_{des} \quad (27)$$

The lateral error of the implement, $\hat{y}_I$, is the distance of the implement control point to the desired line and can be found by:

$$\hat{y}_I = (\hat{e}_I - E_{des})\cos(\psi_{des}) - (\hat{n}_I - N_{des})\sin(\psi_{des}) \quad (28)$$

All other estimates come from the EKF estimation method described previously.

The LQR compensator gain vector ($K_{comp}$) is solved at each time step (by solving the Riccati equation in real time) using the following control state weighting matrix (Q) and control input weighting value (R):

$$Q = \text{diag}[\, Q_y \; Q_\theta \; Q_\psi \; Q_{\dot{\psi}} \; Q_{\ddot{\psi}} \; Q_\delta \; Q_{\dot{\delta}} \,] \quad (21)$$

$$= \text{diag}[\, 1 \; 0 \; 0 \; 0 \; 0 \; 10 \; 0 \,]$$

$R_u = 1.0$ $K_{comp}$ can be computed from Q, $R_u$, $A_c$, and $B_c$. Methods for calculating the LQR gains for a system can be Stengel, R., *Optimal Control and Estimation*, Dover ed, Dover Publications, Meneola, N.Y., 1994, and to Franklin, G., Powell, D., Workman, M., *Digital Control of Dynamic Systems*, 3rd Ed., Addison-Wesley, Menlo Park, Calif., 1998.

The stored desired implement position signal is preferably a pair of east/west coordinates which is stored in a memory (not shown) of the tractor electronic control unit 51, such as part of a stored path to be traversed. The control processor 54 generates a steering control signal as a function of the implement position data, the vehicle position data and the vehicle attitude signal, the implement angle signal, the steering angle signal and the stored desired implement position signal. The steering actuator 13 receives the steering control signal and steers the steerable wheels 12 in response thereto.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A control system for a work vehicle towing a towed implement, the vehicle having a steering system including steering actuator for steering steerable wheels in response to a steering control signal, the control system comprising:

a steering angle sensor for generating a steering angle signal representing an angular position of the steerable wheels;

an implement position generating unit generating actual implement position data;

an desired implement position generating unit generating a desired implement position signal;

a vehicle position generating unit generating vehicle position data;

a processor unit generating an implement angle signal as a function of the actual implement position data and the vehicle position data; and a control processor generating the steering control signal as a function of the actual implement position data, the vehicle position data, the implement angle signal, the steering angle signal and the desired implement position signal, the steering actuator receiving the steering control signal and steering the steerable wheels in response thereto.

2. The control system of claim 1, wherein:

an implement GPS antenna is mounted on the implement and a GPS receiver is coupled to the implement GPS antenna and generates the actual implement position data.

3. The control system of claim 1, wherein:

the vehicle position generating unit comprises a vehicle GPS antenna mounted on the work vehicle, and a vehicle GPS receiver coupled to the vehicle GPS antenna and generating the vehicle position data.

4. The control system of claim 1, further comprising:

a fixed land-based GPS antenna;

a land-based GPS receiver coupled to the land-based GPS antenna and generating reference position data;

a wireless transmitter for transmitting the reference position data;

a vehicle mounted wireless receiver for receiving the reference position data from the transmitter.

5. The control system of claim 4, further comprising:

a plurality of vehicle GPS antennas mounted on the work vehicle;

a GPS receiver coupled to one of the vehicle GPS antennas and generating the vehicle position data;

a vector unit coupled to the vehicle GPS antennas and generating a vehicle attitude signal;

a first processor for generating an implement position signal as a function of the implement position data and the reference position data; and a second processor for generating a vehicle position signal as a function of the vehicle position data and the reference position data.

6. The control system of claim 5, further comprising:

an inverse kinematics processor coupled to the first and second processors and to the vector unit, and generating an implement angle signal as a function of the implement position signal, the vehicle position signal and the vehicle attitude signal; and a control processor coupled to the first and second processors, to the vector unit, to the inverse kinematics processor, to the steering angle sensor, and generating the steering control signal as a function of the implement position signal, the vehicle position signal and the vehicle attitude signal, the implement angle signal, the steering angle signal and a stored desired implement position signal.

7. A control system for a work vehicle towing a towed implement, the vehicle having a steering system including steering actuator for steering steerable wheels, the control system comprising:

a steering angle sensor for generating a steering angle signal representing an angular position of the steerable wheels;

an implement GPS antenna mounted on the implement;

a first GPS receiver coupled to the implement GPS antenna and generating implement position data;

a fixed land-based GPS antenna;

a second GPS receiver coupled to the land-based GPS antenna and generating reference position data;

a wireless transmitter for transmitting the reference position data;

a vehicle mounted wireless receiver for receiving the reference position data from the transmitter;

a plurality of vehicle GPS antennas mounted on the work vehicle;

a third GPS receiver coupled to one of the vehicle GPS antennas and generating vehicle position data;

a vector unit coupled to the vehicle GPS antennas and generating a vehicle attitude signal;

a first processor for generating an implement position signal as a function of the implement position data and the reference position data;

a second processor for generating a vehicle position signal as a function of the vehicle position data and the reference position data;

an inverse kinematics processor coupled to the first and second processors and to the vector unit, and generating an implement angle signal as a function of the implement position data, the vehicle position data and the vehicle attitude signal; and a control processor coupled to the first and second processors, to the vector unit, to the an inverse kinematics processor, to the steering angle sensor, and generating a steering control signal as a function of the implement position data, the vehicle position data and the vehicle attitude signal, the implement angle signal, the steering angle signal and a stored desired implement position signal, the steering actuator receiving the steering control signal and steering the steerable wheels in response thereto.

8. A control system for a work vehicle towing a towed implement, the vehicle having a steering system including steering actuator for steering steerable wheels in response to a steering control signal, the control system comprising:

means for generating position data representing an actual position of the implement and an actual position of the vehicle position;

means for generating desired implement position signal representing a desired position of the implement; and means for generating the steering control signal as a function of the position data and the desired implement position signal, the steering actuator receiving the steering control signal and steering the steerable wheels in response thereto so that the vehicle moves the implement to the desired position.

9. The control system of claim 8, wherein the control system comprises:

a steering angle sensor for generating a steering angle signal representing an angular position of the steerable wheels;

means for generating an implement angle signal as a function of the position data; and means for generating the steering control signal as a function of the position data, implement angle signal, the steering angle signal and the desired implement position signal.

* * * * *